C. B. BURROWS.
ROOT GRUBBING MACHINE.
APPLICATION FILED MAR. 1, 1915.
1,186,375.
Patented June 6, 1916.
2 SHEETS—SHEET 2.
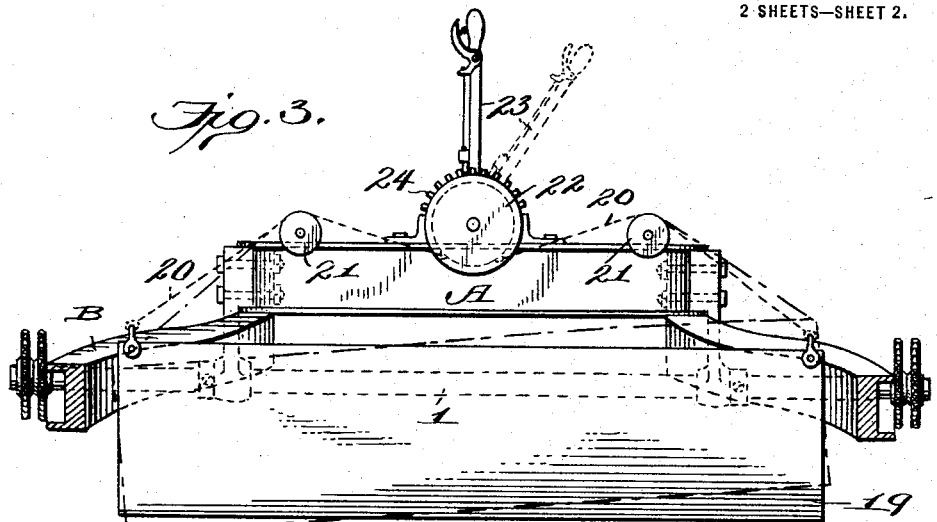
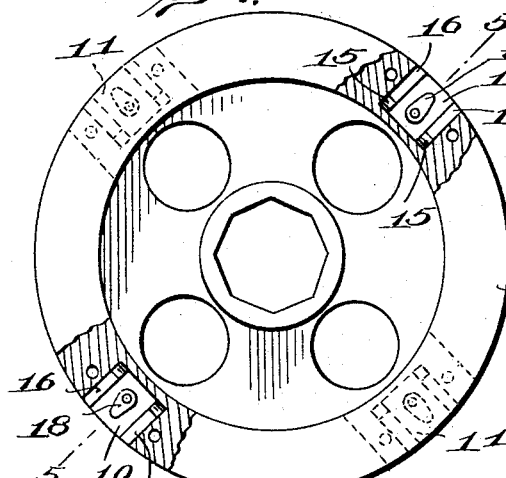
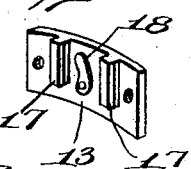
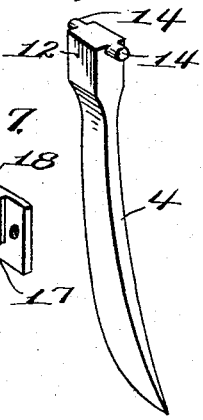
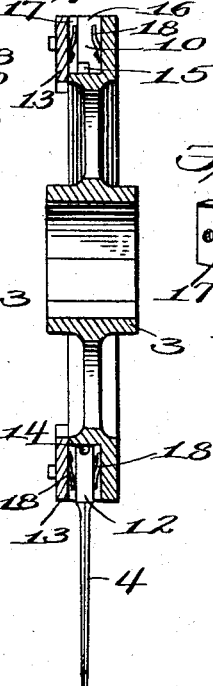
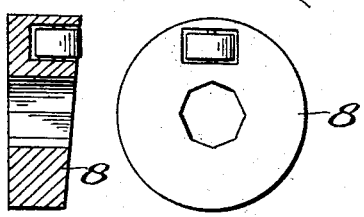
Witnesses:
Inventor
Clarence B. Burrows
by
James L. Norris,
Attorney.

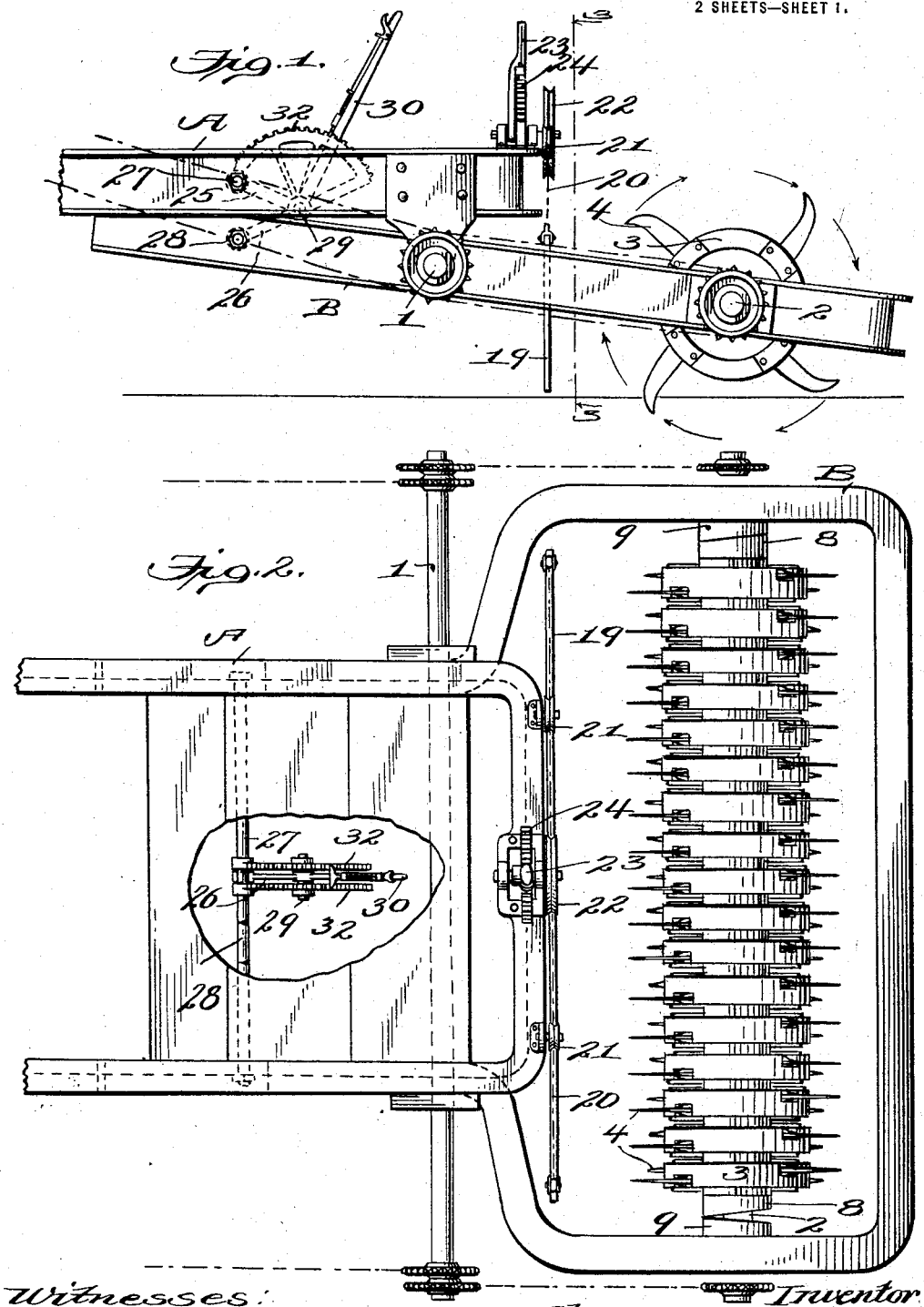

UNITED STATES PATENT OFFICE.

CLARENCE B. BURROWS, OF TAMPA, FLORIDA, ASSIGNOR, BY MESNE ASSIGNMENTS, TO FLORIDA SOIL FERTILITY COMPANY, OF TAMPA, FLORIDA, A CORPORATION OF FLORIDA.

ROOT-GRUBBING MACHINE.

1,186,375. Specification of Letters Patent. Patented June 6, 1916.

Application filed March 1, 1915. Serial No. 11,229.

*To all whom it may concern:*

Be it known that I, CLARENCE B. BURROWS, a citizen of the United States, residing at Tampa, in the county of Hillsborough and State of Florida, have invented new and useful Improvements in Root-Grubbing Machines, of which the following is a specification.

This invention relates to improvements in root grubbing machines and more particularly to a machine which is adapted to cut into small pieces vines and roots lying upon or adjacent the surface of the ground. Machines of this character, which are principally used in the untilled areas in which the palmetto plant grows are designed to so reduce the roots and the creeping stems which honeycomb the ground that the land may be readily cultivated in the ordinary manner and the roots will quickly rot and thereby enrich the soil; and to otherwise prepare the land for cultivation, specifically by loosening and pulverizing the soil. The thick complex growth of the roots and the fact that there are comparatively clear areas of small extent throughout the honeycombed soil are factors which have rendered difficult the production of a machine which shall in every way be well adapted to the purposes intended. The trunk roots which extend near the surface of the soil cover the ground in every direction and are of various sizes and shapes. These trunk roots are provided with small branch roots or tendrils which are very thick and which extend down to the water table. By virtue of the nature and the thick growth of the palmetto roots, it is practically impossible to arrange the root cutting knives in such close association that all of the tendrils will be cut or reduced, and where a percentage of the tendrils escapes the action of the cutting knives it is difficult to thoroughly plow or harrow the land.

It is to the practical solution of the above difficulties that the present invention is directed and the objects of the invention, in brief, are to provide a root grubbing machine wherein the percentage of roots escaping the action of the knives shall be reduced to a minimum and rendered negligible, if not altogether eliminated; and to provide a machine wherein the roots shall be thoroughly reduced in such manner and to such fineness that they will readily rot, regardless of the thickness of their growth, the lack of uniformity of their growth, or variations in the density of the soil.

With the above and other objects in view, the invention consists in certain novel features of structure, relation and combination which will be pointed out as the description proceeds.

An embodiment of the invention is illustrated in the accompanying drawings, wherein:—

Figure 1 is a side elevation of a machine in which the features of the invention are incorporated and showing the application of the machine to one end of the tractor; Fig. 2 is a top plan view thereof; Fig. 3 is a sectional view on the line 3—3 of Fig. 1, looking in the direction of the arrow; Fig. 4 is a detail side elevation, partly in section, of one of the knife carriers or holders; Fig. 5 is a detail sectional view on the line 5—5 of Fig. 4; Fig. 6 is a detail perspective view of one of the knives; Fig. 7 is a detail perspective view of a knife retaining plate forming an element of the knife holder; and Fig. 8 is a detail view of a cam which participates in the operation of shifting the knife holders.

Similar characters of reference designate corresponding parts throughout the several views.

The motive power by which the machine is propelled along the ground is preferably furnished by a traction engine and the machine is arranged at one end of the frame of the tractor, working in advance thereof.

In the embodiment disclosed an end portion of the tractor frame is shown at A and the frame of the root grubbing machine is shown at B. The connection between the two frames preferably comprises a transverse shaft 1 which is supported from the tractor frame, being arranged below the latter, and which passes through the side bars of the machine frame B and forms a pivot for said side bars for a purpose to be hereafter described. The root grubbing instrumentality includes a transverse shaft 2 which is journaled in the side bars of the frame B, the latter projecting for some distance in advance of the tractor frame A and the root grubbing instrumentality working in advance of said tractor frame. The shaft 2 is preferably geared to the shaft 1 aforesaid, for example, by sprocket and chain gearing, and the shaft 1 is suitably geared to the motor of the tractor engine, the gearing being such that the shaft 2 will be driven at a relatively high rate of speed, greatly in excess of the surface speed of the wheels of the traction engine, for example, between four and five hundred revolutions per minute. The root grubbing instrumentality also includes a plurality of knife holders 3 which are mounted on the shaft 2 throughout the extent thereof and which carry root cutting knives 4, the knives 4 projecting in the extended planes of the knife holders 3 which are preferably of disk or wheel form and preferably have their cutting edges so arranged as to act with a shearing or draw cut upon the roots.

The disks 3 rotate continuously with the shaft 2 and the relation between said disks and said shaft is selected to permit a sliding movement of the group of disks, as an entirety, lengthwise of the shaft 2. For this purpose it is preferred to make the shaft 2 of a flat sided cross section (e. g. octagonal) and to make the outlines of the openings in the disks through which the shaft 2 extends conformable to the cross section of said shaft. The knife holders are preferably joined together by dowel pins.

For the purpose of sliding the group of knife holders 3 lengthwise of the shaft 2, the knife holders at the ends of the group are provided with hub cams 8 and the side bars of the frame B are provided with cams 9 adjacent and co-acting with the cams 8 arranged to surround the shaft 2. The cams 8 and 9 are so arranged that a pair of said cams at one end of the group of knife holders will co-act to move the knife holders as an entirety toward the opposite side of the frame, and after such movement has been completed the cams 8 and 9 at the opposite side of the frame will co-act to move the knife holders to the position from which their first movement started. In this way the cams 8 and 9 will produce a continuous reciprocation of the knife holders as an entirety, in a direction lengthwise of the shaft 2 and transverse to the frame B, the extent of reciprocatory movement of the knife holders lengthwise of the shaft 2 being relatively small. It will be seen that while one pair of cams at one side of the machine is operating to shift the knife holders, the other pair of cams at the opposite side of the machine is operating to permit of the shifting of the knife holders and that each cam acts as a thrust bearing for its companion cam. Preferably, one of each pair of cams 8 and 9 is provided with a friction roller for engagement with the working face of the companion cam, as shown in Fig. 8.

Each knife holder is preferably constructed to carry four knives, two at each side thereof. Obviously, however, the knife holders may, if desired, be constructed to carry more than four knives and more than two knives to a side. In the preferred embodiment disclosed, each knife holder has at one side thereof oppositely arranged recesses 10 extending to its circumferential face and at the opposite side thereof similar oppositely arranged recesses 11 extending to its circumferential face, the recesses 11 being arranged midway between the recesses 10 whereby the knives will be equidistantly disposed about the circumference of each knife holder. Each knife 4 is provided at its inner end with an attachment head 12 for engagement in one of the recesses 10 or 11, as the case may be, and the heads 12 are prevented from displacement in a lateral direction from said recesses by closure plates 13 which are secured to the knife holders 3 and extend over the open sides of the recesses 10 and 11. For a purpose which will presently appear, the knives are mounted whereby they may yield laterally relatively to the knife holders. Toward this end the attachment heads 12 of the knives are provided with trunnions 14 which engage in recesses 15 internal to the recesses 10 and 11 and defined by shouldered lugs 16 and 17 arranged in the recesses 10 and 11 and formed, respectively, as parts of the knife holders 3 and the closure plates 13. The recesses 15 for the trunnions 14 are disposed in planes coincident to or parallel with the planes of the knife holders to permit swinging movement of the knives in directions transverse to the knife holders and such swinging movement of the knives is resisted by suitable springs 18, preferably leaf springs, secured, respectively, to the knife holders and the closure plates 13 and bearing against the sides of the attachment heads 12 intermediate the trunnions 14. The lugs 16 and 17 obviously prevent displacement of the attachment heads 12 from the recesses 10 and 11 in the direction of the extended planes of the knife holders.

The nature of the growth of the roots is such, as above explained, that is is impracticable to so closely associate the knives throughout the length of the rotatable shaft in relation to which they are mounted that said knives, by virtue of their close association, thoroughly reduce all of the roots and tendrils. It is in consideration of this fact that the knife holders are mounted for reciprocatory movement, as an entirety, lengthwise of the shaft 2 and that means is provided for effecting reciprocating movement of the knife holders continuously during the rotation thereof. By arranging the knives in as close association as is practicable and by reciprocating the knife holders through an extent corresponding to the spacing between the knives, for example, an inch, it is assured that the knives will thoroughly reduce substantially all of the roots which honeycomb the soil just below its surface in such a way as to render the soil easy of cultivation. By arranging the knives whereby they are strongly held in normal planes relatively to the knife holders, but are capable of lateral yielding movements, it is assured that the knives will not become broken, bent, or otherwise injured consequent to the reciprocation of the knife holders. Thus, it will happen that when the knife holders are reciprocated certain of the knives will be passing through the roots. Were the knives held rigidly with relation to the knife holders they might, in consequence of being embedded in the roots, become broken or bent, but by providing for the lateral yielding of the knives, the danger of breakage thereof or injury thereto consequent to the reciprocatory movement of the knife holders is avoided, and if a particular knife, during its cutting action, has yielded laterally relatively to its holder, it is, upon disengaging the root which it has cut, restored into its normal plane relatively to the holder by the springs 18.

In practice, the knives should work at a uniform depth below the surface of the soil, as is shown in Fig. 1. Irregularity in the density of the soil at different places in the path followed by the machine or variations in the thickness of the underlying root growths may tend to result in the listing or tilting of the machine toward one side or the other. For overcoming this tendency which, in practice, is readily observable, a means may be employed which, as shown, consists of a leveling plate 19 disposed in a vertical plane transversely of the machine and conveniently supported from the end cross-bar of the tractor frame A. The plate 19 is connected at its upper corners to chains or cables 20 passing over suitable guide pulleys 21 and connected to an adjusting sheave 22. The sheave 22 is adjusted by means of a lever or handle 23 working with relation to a rack 24 and having the usual pawl for engagement in said rack. When any list or tilt of the series of knives, toward one side or the other, is observed, the plate 19 should be tilted in the direction of its plane but in an opposite direction to the list or tilt of the series of knives, such tilting of the plate 19 being effected by appropriate movements of the handle 23, as is obvious, and allowing more roots and earth to pass under the side of the series of knives which is listing downwardly, with the result that the machine readily and quickly rights itself, as will be obvious.

The operation of the path 19 in the manner above described, not only corrects the action of the knives during the period in which the plate 19 is being operated, but it also insures that the path which is formed by the knives in the soil and along which the tractor moves shall be substantially regular and flat whereby the causes of the listing of the machine will be confined almost entirely to variations in the density of the ground at different parts of the area in the path of the knives and to variations in the thickness of the underlying growth; and irregularity in the surface elevation of the soil, as a cause of the listing or tilting of the machine, will be almost entirely eliminated. To insure that the wheels or caterpillar feet of the tractor shall work within the flat and regular path produced by the action of the knives, that portion of the frame B which supports the knives and which is located in advance of the frame A is made substantially wider than the frame A whereby the group of knives may have such length that the path or area produced by the cutting action of the knives is substantially greater than the distance between the wheels or caterpillar feet of the tractor. In this way, it is assured that the wheels or feet of the tractor shall always work within the area acted upon by the knives.

The shaft 1, as above stated, forms a pivot for the frame B and, hence, not only efficiently supports the rear portion of the frame B from the frame A, but also permits of pivotal movements of the frame B whereby the depth to which the knives 4 project into the ground may be readily regulated. For the purpose of adjusting the elevation of the front end of the frame B and thus regulating the depth to which the knives 4 project into the ground, it is preferred to employ the construction shown which comprises toggle links 25 and 26 connected, respectively, to cross rods 27 and 28 extending between the side bars of the respective frames A and B. The mutual pivot of the links 25 and 26 consists of a rod 29 upon which, at a point between the links 25, is secured an operating handle 30. The handle 30 is preferably integral with the link 26 which surrounds the rod 28 and works in relation to racks 32 supported conjointly by the rods 27 and 29, the handle having the usual pawl for engagement with said racks. The rod 28 may, if desired, be provided with suitable counterweights in order that the frame B may be easily and quickly adjusted.

Where each knife holder carries four knives and is mounted upon a shaft having an octagonal cross section, as in the embodiment disclosed, the knife holders may be arranged whereby the knives of each holder will be in staggered relation to the knives of the adjoining holders. In this way, the knives will be arranged in eight parallel rows and the intervals between operations of the knives of the several rows will be shorter by half than they would be were all of the knives arranged in alining relation,

*i. e.*, in four parallel rows. By the arrangement just described a further advantage is secured in that the number of knives in each row is less by half than would be the case were all the knives arranged in alining relation and, hence, less resistance is offered to the operation of the machine, the efficiency of operation being, however, in no way impaired. Where the number of knives carried by the several knife holders is greater or less than in the embodiment shown, provision may be made for arranging the knives of each holder in staggered relation to the knives of the adjacent holders by making the shaft 2 of a cross section having twice as many similar flat faces as the number of knives in each holder.

It will be obvious from the foregoing description that the root grubbing action of the machine is highly efficient, its thoroughness being assured by the reciprocation of the knives in a direction transverse to the machine for the purpose of compensating for the spacing between the knives.

While the machine has been described with reference to its use for root grubbing purposes in which use its value is most pronounced, I would have it understood that the machine is capable without departure from the principal features of structure and operation described and hereinafter claimed, of use as a harrowing machine generally in soils of temperate climates and which may be free from roots; and that when used as a harrower it will give highly efficient service, being of particular value, where the ground if hard or rough, in effecting pulverization and aeration of the soil.

Having fully described my invention, I claim:—

1. In a root grubbing machine, in combination, a rotatable element, a plurality of root cutting knives supported along the extent of the element for rotation therewith and for lateral yielding movement, and means for reciprocating the knives as a series in the direction of the axis of the rotatable element continuously during their rotation.

2. In a root grubbing machine, in combination, a rotatable shaft, a plurality of knife holders mounted thereon for rotation therewith, each knife holder being disposed in a vertical longitudinal plane, and means for reciprocating the knife holders as a series longitudinally of the shaft, comprising coöperating cam members at each end of the shaft, acting positively in alternation to shift the knife holders, each cam member operating as a thrust bearing for its companion cam member.

3. In a root grubbing machine, in combination, a rotatable shaft, a plurality of knife holders mounted thereon for rotation therewith, means for reciprocating the knife holders as a series in the direction of the axis of the rotatable element continuously during their rotation, and root cutting knives associated with the knife holders and supported for lateral yielding movement.

4. In a root grubbing machine, in combination, a plurality of rotatable cutting knives arranged in a transverse series along a common axis of rotation, each knife being disposed in a vertical longitudinal plane, and means for reciprocating the knives as a series in the direction of their axis of rotation and concomitantly with their rotation comprising coöperating cam members at each end of the series acting positively in alternation, to shift the knives, each cam member operating as a thrust bearing for its companion cam member.

5. In a root grubbing machine, in combination, a plurality of rotatable cutting knives arranged in a transverse series along a common axis of rotation, each knife being supported for lateral yielding movement, and means for reciprocating the knives as a series in the direction of their axis of rotation and concomitantly with their rotation.

6. In a root grubbing machine, in combination, a knife holder rotatable in a vertical longitudinal plane, a root cutting knife projecting therefrom and movable laterally relatively thereto, and resilient means acting on said knife and holder to maintain the knife in a normal position relative to the holder.

7. In a root grubbing machine, in combination, a rotatable knife holding disk having recesses opening to a side face and to the periphery thereof, root cutting knives having attachment heads fitted in said recesses for lateral movement relative to said holder, and resilient means in said recesses acting on said heads to hold said knives in normal positions relative to the holder.

8. In a root grubbing machine, a plurality of rotatable knife holders, a rotatable shaft upon which the knife holders are mounted, the shaft having a flat sided cross section and the openings in the knife holders through which said shaft extends conforming in outline to the cross sectional outline of said shaft, and means for reciprocating the knife holders as a series longitudinally of said shaft continuously during the rotation of said shaft and therewith of said knife holders.

9. In a root grubbing machine, in combination, a transverse series of rotatable knives, means for transversely reciprocating the knives during their rotation, and means, independent of said last-named means, for permitting the knives to yield transversely.

10. In a root grubbing machine, in combination, a plurality of knives rotatable in longitudinal planes of the machine and having relatively close transverse association and means for transversely reciprocating the knives during their rotation through a distance equal to the interval between transversely adjoining knives.

11. In a root grubbing machine, in combination, a plurality of transversely arranged knife holders rotatable as a series, a group of knives arranged circumferentially of each knife holder, and means for transversely reciprocating the knife holders during their rotation, and acting positively thereon in both directions of reciprocating movement.

In testimony whereof I have hereunto set my hand in presence of two subscribing witnesses.

CLARENCE B. BURROWS.

Witnesses:
B. F. BORCHARDT.
V. C. QUICK.

Copies of this patent may be obtained for five cents each, by addressing the "Commissioner of Patents. Washington, D. C."